Nov. 28, 1961     C P LANMON II     3,010,517
FORMATION TESTING SYSTEMS
Filed July 15, 1960            2 Sheets-Sheet 1
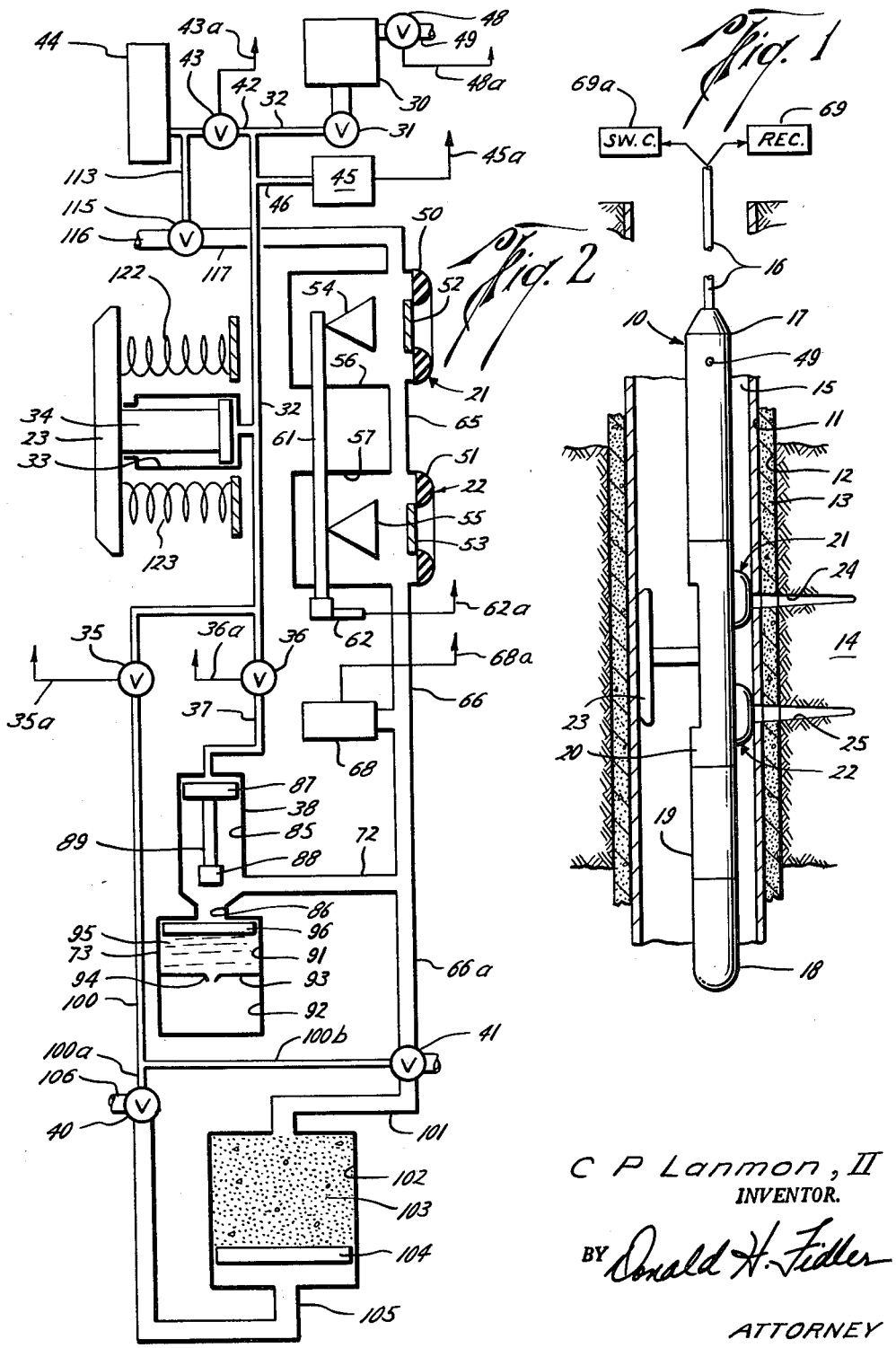
C P Lanmon, II
INVENTOR.
BY Donald H. Fidler
ATTORNEY

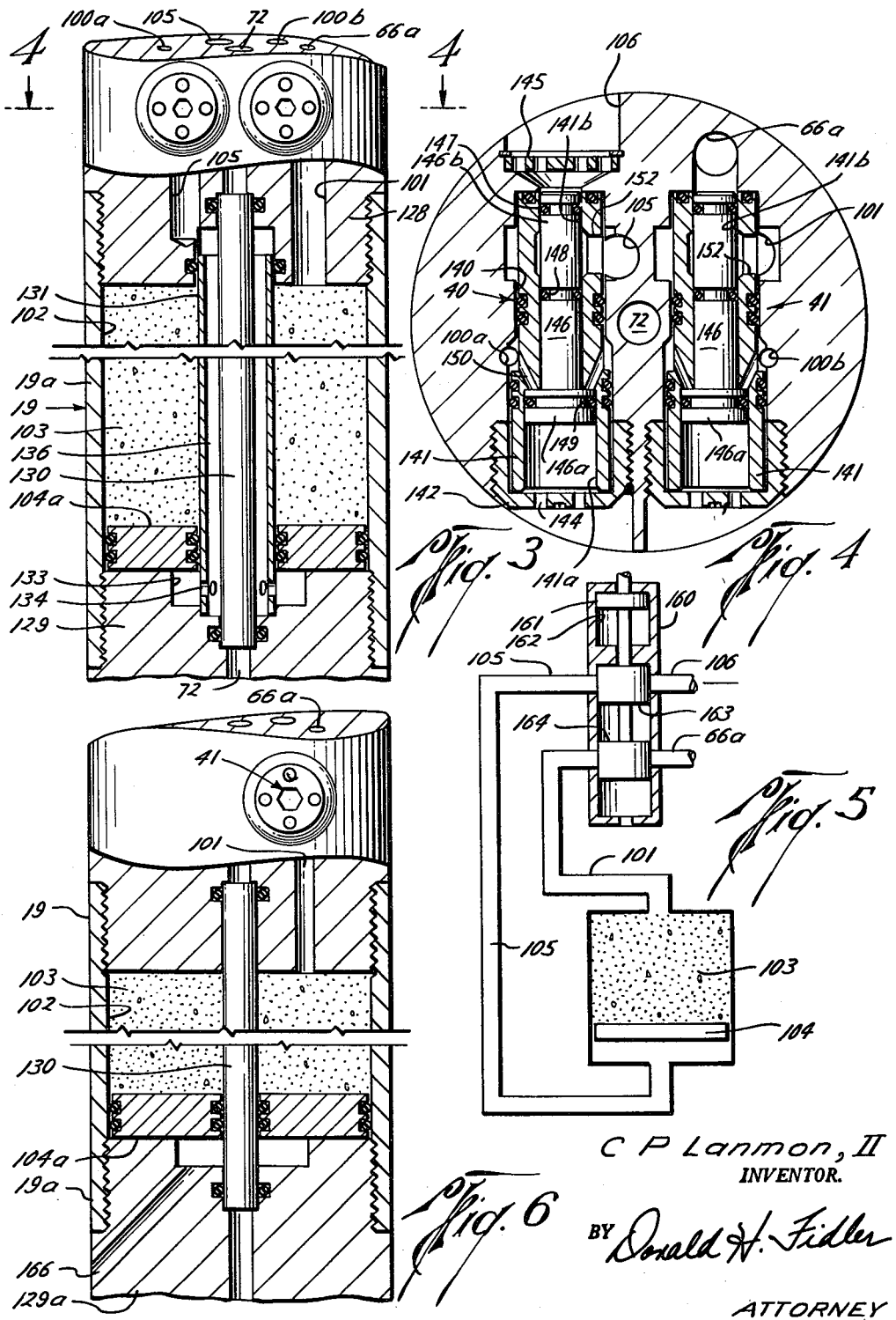

3,010,517
FORMATION TESTING SYSTEMS
C P Lanmon II, Friendswood, Tex., assignor to Schlumberger Well Surveying Corporation, Houston, Tex., a corporation of Texas
Filed July 15, 1960, Ser. No. 43,041
14 Claims. (Cl. 166—100)

This invention relates to new and improved formation testing systems for use in a cased well bore and, more particularly, to tester systems for developing a test penetration through a casing and formations along an isolated portion of a well casing, obtaining a fluid sample and various pressure characteristics of the formations penetrated, and finally plugging the test penetration.

One type of formation tester heretofore employed has a pack-off shoe with a sealing member which is driven into engagement with the sidewall of a casing, the sealing member having a relatively large wall-engaging surface designed to isolate a portion of the casing from the usual drilling or well control fluid in the casing. Perforating means in the tester open the isolated portion of the casing to the formation to permit fluids from the formation to flow through the opening in the casing via a perforator port in the tester to a sample-receiving chamber in the tester. After an amount of fluid is obtained, the sample-receiving chamber is closed, the shoe and sealing member retracted and the apparatus withdrawn from the well bore so that the sample may be measured and analyzed. For a more complete description of the above type of apparatus, reference may be made to the co-pending application of Frank Whitten, S.N. 817,769, filed June 3, 1959, and assigned to the assignee of the present invention.

In another type of formation tester, spaced sample-admitting ports in a tester having individual and diminutive sealing members are isolated on the wall of a casing and subsequently formation fluids are introduced through the ports to obtain fluid samples. For a more complete description of this type of apparatus, reference may be made to the co-pending application of Frank Whitten, S.N. 833,356, filed August 12, 1959. In such apparatus, it will be readily apparent that, after testing of the formations, the casing is left with an unplugged perforation.

Accordingly, it is an object of the present invention to provide new and improved tester apparatus and methods for producing penetrations in earth formations, obtaining a fluid sample and subsequently plugging such penetrations with only one trip of the tester in a well bore.

Another object of the present invention is to provide new and improved tester apparatus for isolating a portion of a cased well bore, opening the earth formations to such isolated portion and subsequently plugging such opening in the earth formations with one trip of the tester in the well bore.

In accordance with the present invention, tester apparatus is provided with at least one sealing member arranged to sealingly engage a side portion of a casing set in a well bore. Perforating means in the tester are arranged to open the formations to the tester via the sealed off portion of the casing to admit a fluid sample to the tester. Cementing means in the tester are arranged to plug the opening to the formations following the testing operation and while the perforated portion of the casing is still sealed off from surrounding well fluid.

The novel features of the present invention are set forth with particularity in the appended claims. The present invention, both as to its organization and manner of operation, together with further objects and advantages thereof, may best be understood by way of illustration and example when taken in conjunction with the accompanying drawings in which:

FIG. 1 is a diagrammatic view in elevation of a tester apparatus embodying the present invention and shown disposed in a cased well bore;

FIG. 2 is a diagrammatic illustration of the operating portions of a tester apparatus, as shown in FIG. 1;

FIG. 3 is a cut-away view partially in cross section of the cementing apparatus in the tester of FIG. 1;

FIG. 4 is a view in cross section taken along line 4—4 of FIG. 3;

FIG. 5 is a modification of the valves shown in FIG. 4;

FIG. 6 is another embodiment of a cementing apparatus for use with a formation tester.

In FIG. 1 of the drawings, a formation sampling apparatus or tester 10 is shown disposed in a casing 11, which is cemented in a well bore 12 by a column of cement 13, the well bore 12 traversing earth formations 14. Casing 11 contains a control or bore fluid 15 to provide a hydrostatic control pressure for the well in a well known manner. Apparatus 10, in which the present invention is embodied, is suspended in the casing 11 by a cable 16 connected to a winch (not shown) located at the surface of the earth, the winch and cable serving to lower and raise the apparatus in a customary manner.

The tester apparatus 10 is generally comprised of pressure resistant housing sections 17, 18, 19 and a testing section 20. The testing section 20 is provided with spaced, fluid-sample admitting means 21, 22 extending outwardly from the section and disposed along the length of the section so as to lie in a central plane extending longitudinally of the testing section. Diametrically opposed from the sample-admitting means 21, 22 is a wall-engaging member 23 mounted so as to move between a retracted position and an extended position. Section 17 generally contains hydraulic motive means for actuating the wall-engaging member 23 of the testing section 20, while section 18 generally contains the fluid-sample receiving means to receive a fluid sample from the sample-admitting means 21, 22. Section 19 contains the cementing apparatus of the present invention.

As shown in FIG. 1, when the wall-engaging member 23 is extended, the fluid-sample admitting means 21, 22 are in sealing engagement with the wall of the casing 11. In this position, explosive means in the testing section 20 (which are associated with the sampling means 21, 22) may be employed to perforate the formations, thereby permitting fluids from the earth formation to flow into the testing section 20. It will be noted that the dual perforations 24, 25 produced by the explosive means are spaced in depth along the casing, thereby permitting an interval along the formations to be sampled. Thus, a greater area of the earth formations is sampled which decreases the possibilities of missing a permeable zone and increases the reliability of obtaining a fluid sample at a testing level.

For the sake of conciseness in describing the present invention, certain aspects of the apparatus in which the present invention is embodied are only briefly described herein since the details of such aspects are not directly related to the present invention and are more fully disclosed in one or more of the co-pending applications and patents assigned to the assignee of the present invention, as hereinafter noted: R. L. Des Brandes and R. Q. Fields, S.N. 560,710, filed Jan. 23, 1956; Frank Whitten, S.N. 817,769, filed Aug. 12, 1959; and L. S. Chambers, Patent No. 2,674,439.

Referring now to FIG. 2, the operational components of an entire subsurface apparatus 10 are diagrammatically illustrated to show more clearly the overall relationship and operation of the various components of the apparatus in conjunction with the present invention.

In the first step of operation, the fluid sampling means 21, 22 must be placed in sealing engagement with the wall of the casing. To attain the sealing engagement, the wall-engaging member or back-up shoe 23 is moved relative to testing section 20 by means of a hydraulic system which includes hydraulic pressure developing means 30 (upper portion of drawing) connected through a pressure regulating valve 31 to a high pressure conduit 32, the conduit 32 opening into a cylinder 33 in the testing section 20. A piston 34 is slidably and sealingly received in cylinder 33 and has an end portion secured to the wall-engaging member 23 so that, when the pressure means 30 is actuated, the piston 34 travels outwardly from the testing section 20 by virtue of hydraulic pressure applied to the fluid medium in the hydraulic system. The wall-engaging member 23, upon engaging the bore wall, permits the pressure to urge sampling means 21, 22 into sealing engagement along a length of the bore wall.

Conduit 32, at its lower end, is coupled to a pair of normally closed break valves 35 and 36. Valve 36, when open, serves to couple the high pressure conduit 32 through another conduit 37 to a seal valve 38 while valve 35, when open, serves to couple the high pressure conduit 32 through conduits 100, 100a and 100b to normally closed pressure-actuated valves 40 and 41. The function of valve 38, 40 and 41 will be more fully explained in the description to follow in the proper sequence of operation.

It is, of course, also necessary to provide for reduction of the hydraulic pressure when it is desired to retract the wall-engaging member 23 and this will be more fully explained in the description to follow, it being sufficient to note that the upper end portion of conduit 32 has an extension 42 leading to a normally closed break-valve 43, the valve 43 blocking the conduit 32 from an empty dump chamber 44.

To provide indications of the pressure of the hydraulic system, a pressure transducer 45 is connected by a conduit extension 46 to the conduit 32. Transducer 45 is adapted to produce electrical signals in response to pressure changes and an electrical lead 45a, connected to the transducer 45, passes through the cable 16 to conventional, surface located, indicating means (not shown) in a conventional recorder 69 which provide indications of the pressure of the hydraulic system.

Of the foregoing portions of the described apparatus, pressure means 30, regulating valve 31, dump chamber 44, break valve 43 and transducer 45 are located in housing section 17 (FIG. 1) of the apparatus 10. These components are described in further detail in the aforesaid application of R. L. Des Brandes and R. Q. Fields.

However, by way of general explanation, it will be noted that pressure means 30, while not specifically illustrated, includes a hydraulic cylinder and piston arrangement responsive to the opening of a normally closed break valve 48 (which has an opening 49 to the exterior of the housing section 17, FIG. 1) so that, when actuated, bore fluid 15 may actuate the arrangement to provide fluid under pressure for the hydraulic system.

Regulator valve 31 between pressure means 30 and conduit 32 functions to limit the pressure of the fluid in conduit 32 to a predetermined value regardless of the hydrostatic pressure in the well, thereby preventing pressures in excess of the pressure rating of the system.

In the testing section 20 are the sample-admitting means 21, 22 which include annular, resilient sealing pads 50, 51 disposed over thin-walled portions 52 and 53. Shaped charge explosive means 54, 55 are disposed in chambers 56, 57 therebehind. The shaped charges 54, 55 are connected to igniter means such as a detonating cord 61 and a blasting cap 62, the blasting cap being ignitable upon receipt of electrical energy from surface control equipment (not shown) via a conductor 62a in cable 16. Hence it may be appreciated that when the sealing pads 50, 51 are in sealing engagement with the wall of the casing and the shaped charges 54, 55 are detonated, perforations will be produced in adjacent earth formations, thereby permitting formation fluids to flow through the perforated wall portions 52, 53 into the chambers 56, 57.

Chambers 56, 57 are interconnected by means of a conduit 65 for fluid communication while the lower chamber 57 is connected by conduits 66 and 72 to the normally open seal valve 38 which opens into a sample-receiving device 73. Also connected to the conduit 66 is a pressure transducer 68 which corresponds in construction to transducer 45 and serves to derive indications of the pressure in the conduit 66 which is, of course, representative of the pressure of the fluids in the earth formations. Transducer 68 is similarly connected by a conductor 68a to indicating means or recorder 69 (FIG. 1) at the surface of the earth. Thus, it will be appreciated that when the fluid sampling means 21, 22 are opened to admit a fluid sample, the pressure of the fluids in the formations is sensed by the pressure transducer 68 and is recorded by the surface indicating equipment. The fluid sample passes via conduits 66 and 72 and seal valve 38 to the sample-receiving device 73. Conduit 66 is also connected by an extension 66a to the normally closed valve 41.

Seal valve 38 is detailed and described in the aforesaid Fields and Des Brandes application and generally includes upper and lower cylinders 85, 86 which are adapted to respectively receive an upper seal piston 87 and a lower seal valve head 88, the piston 87 and head 88 being interconnected by a rigid member 89. In the normal position of the seal valve 38, the piston 87 is in an upward position in cylinder 85 so that the valve head 88 is not blocking cylinder 86, thus permitting a fluid sample to flow between conduit 72 and the sample-receiving device 73. To operate the seal valve 38 to close off the sample-receiving device 73, the upper end of cylinder 85 is connected by conduit 37 to the normally closed valve 36 in the high pressure conduit 32. Valve 36 has a conductor 36a extending through cable 16 to the surface control means. Thus, when valve 36 is opened, high pressure is applied to piston 87 moving it downward so that piston 88 enters cylinder 86 to seal the opening to the sample-receiving device 73, thereby preventing further fluid flow into the device.

Sample-receiving device 73 is described and detailed in the aforesaid patent to L. M. Chambers and generally includes upper and lower chambers 91, 92 separated by a partition 93 having a flow restricting orifice 94. A fluid 95 such as water is disposed in the upper chamber 91 and separated from the cylinder 86 by a floating piston 96 which is initially positioned in the upper end of the chamber 91. Lower chamber 92 is filled with air, the piston 96 being held in position by frictional forces of piston sealing means such as O rings. Hence, formation fluids entering cylinder 86 move piston 96 downwardly at a rate determined by the flow of fluid through orifice 94.

After a sample has been obtained and it is desired to plug the perforations 24, 25, valve 35 is opened which couples the high pressure conduit 32 via conduits 100, 100a, 100b to valves 40 and 41 and the valves 40, 41 are thereby actuated. Valve 41, when actuated, connects the conduit 66a to a conduit 101. Conduit 101 is coupled to a cylinder 102 containing a plugging material 103 such as cement. A piston 104 in the cylinder 102 has one side in contact with the material 103 and the other side coupled by a conduit 105 to valve 40. Valve 40, when actuated, admits well fluid (at hydrostatic pressure) via a conduit 106 to conduit 105. Since the pressure of the well fluid is greater than the pressure of the formation fluids, piston 104 is moved by virtue of the pressure of the well fluid to force the material 103 via conduits 101, 66a and 66 to the sample-admitting means 21 and 22 and into the penetrations 24 and 25, thereby plugging the penetrations. It should be noted that the provision of valves 40 and 41 minimizes the difficulty of keeping cement fluid at high temperatures over the period of time required to take sample.

After the penetrations 24 and 25 have been plugged to retrieve the apparatus 10, it is necessary to disengage the wall-engaging member 23 and sealing pads 50, 51 from the wall of the casing. Dump valve 43 is provided with a conductor 43a extending through cable 16 to the surface control means and when dump valve 43 is actuated by the surface control means, the fluid in the hydraulic system is permitted to flow into dump chamber 44. Chamber 44 is constructed with a sufficient volume to receive the hydraulic fluid of the pressure system, thereby to reduce to a small value, the pressure on the fluid in the system. Valve 45 also applies the hydraulic pressure in the system via a conduit 113 to a pressure-actuated, pressure-equalizing valve 115. Valve 115 has inlet and outlet conduits 116, 117 to couple the bore fluid to the sample-admitting means 21 and 22, when valve 115 is actuated. Thus, the pressure across the sealing pads 50, 51 is equalized to facilitate removal of the sealing pads from the bore wall.

When the hydraulic pressure in conduit 32 is reduced, the pressure of the well fluid becomes greater than the pressure of the hydraulic system and serves to urge the wall-engaging member 23 towards a retracted position. To facilitate the retraction of member 23, should it stick to the wall of the bore, heavy springs 122, 123 are connected between the member 23 and testing section, the springs being tensioned in the extended position of the member 23 so that the force of the springs tends to move member 23 inwardly towards a retracted position. Once member 23 is retracted, the apparatus may be removed from the well and the cement will set in the perforations.

In operation, the apparatus 10 is lowered in the casing 11 to the level to be tested by means of the cable 16 as shown in FIG. 1. A switch control 69a at the earth's surface is operated to provide electrical energy via conductor 48a (FIG. 2) to actuate the valve 48 in housing section 17. Thus, valve 48 is opened, thereby permitting bore fluid 15 to actuate the pressure means 30 and produce amplified hydraulic pressure for the hydraulic system. The pressure of the fluid in the hydraulic system is regulated by regulating valve 31 and applied via conduit 32 to the cylinder 33 containing piston 34 which moves the wall-engaging member 23 relative to the testing section 20 until the pad members 50, 51 of the fluid sampling means 21, 22 sealingly engage the wall of the bore (see FIG. 1). It will be noted that dump valve 43 and valves 35 and 36, associated with conduit 32, are normally closed.

As the sealing pads 50, 51 of the fluid sampling means 21, 22 move into sealing engagement with the wall of casing 11, the pressure in the hydraulic system increases to the maximum value of the hydraulic system. The pressure of the hydraulic system is sensed by the pressure responsive means 45 and recorded by the recorder 69.

Thereafter, the shaped charges 54, 55 in the testing section 18 are detonated by providing electrical energy from switch control 69a to the blasting cap 62 and the earth formations are perforated as typically shown at 24 and 25 in FIG. 1. Hence, the thin wall portions 52, 53 are opened by the explosive means so that formation fluids may flow into the chambers 56, 57 of the testing section 20 and into the sample-receiving device 73 via conduits 65, 66, 72 and seal valve 38. As the sample chamber 91 receives the formation fluids, the floating piston 96 is moved downwardly, thereby displacing the cushioning fluid 95 below it, through orifice 94 into the lower chamber 92. During this period of time, pressure responsive means 68 provides indications of the pressure to recorder 69 of the flowing formation fluids into the sample-receiving chamber 73. If the sample chamber 73 fills up, a final pressure reading will be obtained by pressure means 68 before closing the seal valve; however, in the event the chamber 91 does not fill up in a certain length of time, the closing of the seal valve 38 permits a final shut-in pressure reading of the formation to be obtained by the transducer or pressure means 68.

Next, switch control 69a is actuated to provide electrical energy via conductor 35a to open valve 35 and the application of fluid under pressure serves to actuate valves 40 and 41. Valve 40 couples well fluid 15 to one side of the piston 104 in the cylinder 102 while the valve 41 couples the material 103 on the other side of the piston 104 to the sample-admitting means 21 and 22 via conduits 101, 66a and 66. After the perforations 24 and 25 have been plugged by the material 103, switch control 69a is actuated to provide electrical energy via conductor 43a to the dump valve 43 which is actuated to reduce the hydraulic pressure of the system. The hydraulic pressure release to the dump chamber 44 also actuates the pressure-equalizing valve 115 via conduit 113 to couple bore fluid 15 to the sample-receiving means 21 and 22. Thus, the pressure-equalizing valve 115 permits the pressures across the sealing pads 50, 51 to be equalized. The pressures of the bore fluid 15 are also sensed by the pressure-responsive means 68 to provide an indication of the pressure of the bore fluid.

As the pressure of the hydraulic system decreases, the pressure of the bore fluid 15 urges member 23 towards a retracted position, this movement being assisted by springs 122 and 123 which were tensioned in the extended position of member 23. When member 23 is completely retracted, apparatus 10 is retrieved from the bore and the collected sample analyzed.

Referring now to FIGS. 3 and 4 for more details of the present invention in all of its aspects which are embodied in cementing section 19, the section is comprised of an elongated, tubular member 19a which forms cylinder 102 and is coupled at its ends to upper and lower housing subs 128, 129, respectively. Conduit 72 is extended between subs 128, 129 by virtue of a tubular member 130 sealingly received in counterbores in the subs. A tubular member 131 of larger diameter than member 130 is concentrically disposed about tubular member 130 and has its ends received in counterbores in the subs 128, 129.

An annular piston 104a is sealingly and slidably received within cylinder 102 and has an aperture slidably and sealingly received about the tubular member 131. Piston 104a is normally arranged adjacent to the end surface of lower sub 129 and an annular recess 133 in sub 129 is connected by ports 134 in the tubular member 131 to an annular space 136 between tubular members 130 and 132. At the upper end of tubular member 131 within the upper sub 128, the annular space 136 is connected to the conduit 105 in upper sub 128. The cylinder 102 is filled with the plugging material 103 and conduit 101 in upper sub 128 opens into cylinder 102. From the foregoing description, it will be appreciated that conduit or flow passage 72 may be passed uninterrupted through section 19 and that fluid under pressure in conduit 105 will act on piston 104a to force the plugging material 103 into conduit 101.

Referring now to FIG. 4, valves 40 and 41 are more specifically illustrated. Since certain features of the valves are identical, like numeral designations will be used in such instances. Valve 40 generally has a bore 140 which receives a tubular cylinder member 141 held in the bore 140 by a cap 142. Cylinder member 141 is comprised of a relatively large diameter cylinder portion 141a open to the bore fluid 15 by ports 144 in cap 142 and a smaller diameter cylinder portion 141b open to the bore fluid 15 by a ported plate 145. A piston member 146 has large and small piston portions 146a, 146b, respectively, slidably and sealingly received in cylinder portions 141a, 141b.

The piston portion 146a is provided with an O ring 149 while piston portion 146b has O rings 147, 148 spaced along its length. In the normal position of piston member 146 in cylinder member 141, ports 150 in cylinder member 141 connect conduit 100a to one side of piston portion 146a while ports 152 in cylinder member 141 connect conduit 105 to the section of piston portion 146b intermediate seals 147, 148. Valve 40 is operated by the application of fluid under pressure in conduit 100a to piston portion 146a, thereby moving the piston member to unblock ports 152 in the cylinder member 141 to permit well fluid to enter via the ported plate 145 to conduit 105.

Valve 41 is arranged similarly to valve 40, except that the smaller diameter cylinder portion 141b opens to conduit 66a. Hence, fluid under pressure in conduit 100b applied to piston portion 146a moves the piston member 146 to unblock ports 152 in cylinder member 141 to permit the coupling of conduits 66a and 101.

Referring now to FIG. 5, an embodiment of the valve system is shown wherein valves 40 and 41 may be combined in a single valve 160. In valve 160, an actuating piston 161 in a cylinder 162, when actuated, serves to shift piston type valve members 163, 164 from a position where conduits 105, 106 and 66a, 101 are isolated from one another to a position placing conduits 105, 106 and 66a, 101 in respective fluid communication. As shown in FIG. 6, the valve system may be further modified by the elimination of valve 40. In this ararngement, one side of piston 104a is always open to the pressure of the well fluid 15. As illustrated, piston 104a is connected to the exterior of the sub 129a by a conduit 166. In this arrangement, valve 41 being closed prevents loss of material 103 from the cylinder 102 and when valve 41 is actuated, conduits 66a and 101 are coupled to one another so that the pressure of the well fluid 15 serves to move the piston 104a and thus material 103 into conduit 66a. It will be noted that the difference between the use of only one valve 41 and two valves 40 and 41 depends upon the character of material 103. This is because many cementing materials tend to set or harden under temperature and pressure so that the use of valve 40 decreases the critical nature of the cement employed.

While particular embodiments of the present invention have been shown and described, it is apparent that changes and modifications may be made without departing from this invention in its broader aspects and, therefore, the aim in the appended claims is to cover all such changes and modifications as fall within the true spirit and scope of this invention.

I claim:

1. Tester apparatus comprising: a support member adapted for passage through a cased bore to a level where a test is desired, said support member having a sample-receiving chamber; a wall-engaging member mounted on said support member for movement between a retracted position and an extended position into engagement with the casing sidewall; sample-admitting means carried by one of said members for isolating a portion of the casing; means associated with said sample-admitting means for opening said sample-admitting means and penetrating the casing and earth formations when said sample-admitting means isolate a section of the casing; a passageway for coupling said sample-admitting means for fluid communication with said sample-receiving chamber; normally open seal valve means in said passageway operable for closing said sample-receiving chamber; means in said support member for selectively operating said seal valve means; and cementer means in one of said members containing unset cement, said cementer means being a fluid coupled relationship with said passageway and said sample-admitting means including normally closed valve means selectively operable after said seal valve means are closed to couple said cement in said cemeter means to said passageway.

2. Tester apparatus comprising: a support member adapted for passage through a cased bore to a level where a test is desired, said support member having a sample-receiving chamber; a wall-engaging member mounted on said support member for movement between a retracted position and an extended position into engagement with the casing sidewall; sample-admitting means carried by one of said members for isolating a portion of the casing; means associated with said sample-admitting means for opening said sample-admitting means and penetrating the casing and earth formations when said sample-admitting means isolate a section of the casing; a first passageway for coupling said sample-admitting means for fluid communication with said sample-receiving chamber; normally open seal valve means in said first passageway operable for closing said sample-receiving chamber; means in said support member for selectively operating said seal valve means; and cementer means in one of said members including a cylinder having openings at its ends; a second passageway coupling one of said openings to said first passageway and a piston slidably received by said cylinder and normally positioned adjacent to the other of said openings to said cylinder, said cylinder containing unset cement between the said one opening and said piston; a normally closed valve means in said second passageway selectively operable to couple said second passageway to said first passageway, whereby pressure applied through said other opening to said cylinder after said seal valve means is closed urges said unset cement out of said one opening into said first and second passageways.

3. Tester apparatus comprising: a support member adapted for passage through a cased bore containing borehole fluid to a level where a test is desired, said support member having a sample-receiving chamber; a wall-engaging member mounted on said support member for movement between a retracted position and an extended position into engagement with the casing sidewall; sample-admitting means carried by one of said members for isolating a portion of the casing; means associated with said sample-admitting means for opening said sample-admitting means and penetrating the casing and earth formations when said sample-admitting means isolate a section of the casing; a first passageway for coupling said sample-admitting means for fluid communication with said sample-receiving chamber; a normally open seal valve in said first passageway operable for closing said sample-receiving chamber; means in said support member for selectively operating said seal valve; and cementer means in one of said members including a cylinder having openings at its ends; a second passageway coupling one of said openings to said first passageway; a piston slidably received by said cylinder and normally positioned adjacent to the other of said openings, said cylinder containing unset cement between said piston and said one opening; normally closed valve means in said second passageway selectively operable to couple said one opening to said first passageway; a third passageway coupling said other opening to the exterior of the support member whereby pressure of such borehole fluid applied through said other opening to said cylinder after said seal valve is closed urges said unset cement out of said one opening into said second passageway.

4. Tester apparatus comprising: a support member adapted for passage through a cased bore containing borehole fluid to a level where a test is desired, said support member having a sample-receiving chamber; a wall-engaging member mounted on said support member for movement between a retracted position and an extended position into engagement with the casing sidewall; sample-admitting means carried by one of said members for isolating a portion of the casing; means associated with said sample-admitting means for opening said sample-admitting means and penetrating the casing and earth formations when said sample-admitting means isolate a section of the casing; a first passageway for coupling said sample-admitting means for fluid communication with said sample-receiving chamber; normally open seal valve means in said first passageway operable for closing said sample-receiving chamber; means in said support member for selectively operating said seal valve means; and cementer means in one of said members including a cylinder having openings at its ends; a second passageway coupling one of said openings to said first passageway; a piston slidably received by said cylinder and normally positioned adjacent to the other of said openings, said cylinder containing unset cement between said piston and said one opening; a third passageway coupling said other opening to the exterior of said support; a first normally closed valve in said third passageway operable to open said third passageway whereby borehole fluid pressure is applied to one side of said piston; a second valve in said second passageway operable to couple said second passageway to said first passageway; and means to operate said first and second valves substantially simultaneously, whereby penetrations in the earth formations may be plugged with said unset cement.

5. Tester apparatus comprising: a support member adapted for passage through a cased bore to a level where a test is desired, said support member having a sample-receiving chamber; a wall-engaging member mounted on said support member for movement between a retracted position and an extended position into engagement with the casing sidewall; sample-admitting means carried by one of said members for isolating a portion of the casing; means associated with said sample-admitting means for opening said sample-admitting means and penetrating the casing and earth formations when said sample-admitting means isolate a section of the casing; a passageway for coupling said sample-admitting means for fluid communication with said sample-receiving chamber; normally open seal valve means in said passageway operable for closing said sample-receiving chamber; means in said support member for selectively operating said seal valve means; means forming a contractable chamber in said support in a normally extended condition and arranged to contract under applied pressure, said contractable chamber being filled with unset cement in its extended condition; means for selectively coupling said contractable chamber to said sample-admitting means and to apply pressure to said contractable chamber after said seal valve is closed including selectively operable valve means.

6. Tester apparatus comprising: a support member adapted for passage through a cased bore containing borehole fluid to a level where a test is desired, said support member having a sample-receiving chamber; a wall-engaging member mounted on said support member for movement between a retracted position and an extended position into engagement with the casing sidewall; sample-admitting means carried by one of said members for isolating a portion of the casing; means associated with said sample-admitting means for opening said sample-admitting means and penetrating the casing and earth formations when said sample-admitting means isolate a section of the casing; a first passageway for coupling said sample-admitting means for fluid communication with said sample-receiving chamber; normally open seal valve means in said first passageway operable for closing said sample-receiving chamber; means in said support member for operating said seal valve means; means forming a contractible chamber in said support in a normally extended condition and arranged to contract under applied pressure said contractible chamber being filled with unset cement; second and third passageways respectively coupling said contractible chamber between the exterior of said support and said sample-admitting means; and first and second normally closed valve means respectively in said passageways selectively operable to couple borehole fluid at its hydrostatic pressure to said contractible chamber to contract the same, and to couple said chamber to said sample-admitting means.

7. Tester apparatus comprising: a support member adapted for passage through a cased bore to a level where a test is desired, said support member having a sample-receiving chamber; a wall-engaging member mounted on said support member for movement between a retracted position and an extended position into engagement with the sidewall of the bore; a plurality of sample-admitting means carried by one of said members for testing an interval of earth formations along said bore, each of said means including sealing members for isolating portions of the casing wall, said sealing members being spaced apart in longitudinal alignment; and means in said one member for placing the isolated portions of the casing wall in fluid communication with said sample-receiving chamber including explosive means in said one member for providing openings centrally of the respective sealing members and for penetrating the casing and the earth formations adjacent to said sealing members and further including a passageway coupling said sample-admitting means to said sample-receiving chamber; and normally open seal valve means operable for closing said sample-receiving chamber; means in said support member for operating said seal valve means; cementer means containing unset cement coupled to said sample-admitting means; and valve means selectively operable after said seal valve means are closed to open said cementer means to said sample-admitting means to plug said penetrations in said earth formations with said cement.

8. Tester apparatus comprising: a support member for passage through a cased well bore containing borehole fluid to a level where a test is desired; said support member including a testing section, a cementer section and a sample-receiving section coupled to one another in the recited order; said support including means for coupling said testing section in an isolated section of the casing and the earth formations therebehind; said cementer section including a cylinder having upper and lower ends and a first axis extending longitudinally of said support member; a tubular member having a second axis coinciding with said first axis and extending through the ends of said cylinder to provide a fluid passageway between said testing section and said sample-receiving section; an annular piston slidably and sealingly received between the outer wall of said tubular member and the inner wall of said cylinder, said piston being normally disposed adjacent the lower end of said cylinder; a first passageway in said cementer section to said lower cylinder end coupling one side of said piston to the exterior of said support member for communication with the borehole fluid; unset cement disposed on the other side of said piston and filling said cylinder; a second passageway coupling said testing section to the upper end of said cylinder; and normally closed valve means in said second passageway operable to couple said cement to said testing section.

9. Tester apparatus comprising: a support member for passage through a cased well bore containing borehole fluid to a level where a test is desired; said support member including a testing section, a cementer section and a sample-receiving section coupled to one another in the recited order; said support including means for coupling said testing section in an isolated section of the casing and the earth formations therebehind; said cementer section including a cylinder having upper and lower ends and a first axis extending longitudinally of said support member; a tubular member having a second axis coinciding with said first axis and extending through the ends of said cylinder to provide a fluid passageway between said testing section and said sample-receiving section; an annular piston slidably and sealingly received between the outer wall of said tubular member and the inner wall of said cylinder, said piston being normally disposed adjacent the lower end of said cylinder; a first passageway in said cementer section to said lower cylinder end coupling one side of said piston to the exterior of said support member for communication with the borehole fluid; unset cement disposed on the other side of said piston and filling said cylinder; a second passageway coupling said testing section to the upper end of said cylinder; and normally closed valve means in said second passageway operable to couple said cement to said testing section, said valve means including a piston and cylinder where a portion of said piston blocks said second passageway and is movable to unblock the same.

10. A tester assembly for use in a cased well bore including a tester section, a cementer section and a sample-receiving section coupled to one another in the recited order, said assembly being adapted to be lowered in a cased well bore; sample-admitting means on said tester section operative to engage and isolate a section of a wall of a casing; explosive means in said tester section for producing a penetration into the earth formations adjacent to the isolated section of the casing; said sample-receiving section including means for receiving a fluid sample from such penetrated earth formations; concentric tubular members extending through said cementer section forming an annular passageway therebetween, the inner tubular member comprising part of a passageway between said tester section and sample-receiving section for passage of fluid therebetween, said cementer section including a tubular housing forming a cylinder and an annular piston slidably and sealingly received between said outer tubular member and the inner wall of said cylinder, said piston being normally positioned at one end of said cylinder, said cylinder containing unset cement, said cement filled portion of said cylinder being operatively coupled to said sample-admitting means for plugging such penetrated earth formations after a fluid sample is obtained and while the wall of the casing is isolated, said annular passageway being opened to said one end of said cylinder to admit fluid under pressure to said annular piston.

11. A tester assembly for use in a cased well bore including a tester section, a cementer section and a sample receiving section coupled to one another in the recited order, said assembly being adapted to be lowered in a cased well bore; sample-admitting means on said tester section operative to engage and isolate a section of a wall of a casing; explosive means in said tester section for producing a penetration into the earth formations adjacent to the isolated section of the casing; said sample-receiving section including means for receiving a fluid sample from such penetrated earth formations; concentric tubular members extending through said cementer section forming an annular passageway therebetween, the inner tubular member comprising part of a passageway between said tester section and sample-receiving section for passage of fluid therebetween, said cementer section including a tubular housing closed at its ends and forming a cylinder; an annular piston slidably and sealingly received between said outer tubular member and the inner wall of said cylinder, said piston being normally positioned at one end of said cylinder, said cylinder containing unset cement; a first passageway opening to the other end of said cement filled portion of said cylinder and coupling said cylinder to said sample-admitting means for plugging such penetrated earth formations after a fluid sample is obtained and while the wall of the casing is isolated; a second passageway coupling said annular passageway between said one end of said cylinder and the exterior of said support member to admit fluid under pressure to said annular piston; and normally closed valve means for said first and second passageways.

12. Tester apparatus comprising: a support member adapted for passage through a cased bore containing borehole fluid to a level where a test is desired, said support member having a sample-receiving chamber; a wall-engaging member mounted on said support member for movement between a retracted position and an extended position into engagement with the casing sidewall; sample-admitting means carried by one of said members for isolating a portion of the casing; means associated with said sample-admitting means for opening said sample-admitting means and penetrating the casing and earth formations when said sample-admitting means isolate a section of the casing; a first passageway for coupling said sample-admitting means for fluid communication with said sample-receiving chamber; a normally open seal valve in said first passageway operable for closing said sample-receiving chamber; means in said support member for selectively operating said seal valve; and cementer means in one of said members including a cylinder having openings at its ends; a second passageway coupling one of said openings to said first passageway; a piston slidably received by said cylinder and normally positioned adjacent to the other of said openings, said cylinder containing unset cement between said piston and said one opening; normally closed valve means in said second passageway selectively operable to couple said one opening to said first passageway, said valve means including a valve piston and valve cylinder wherein a portion of said piston normally blocks said second passageway and is movable to unblock the same; a third passageway coupling said other opening to the exterior of the support member whereby pressure of such borehole fluid applied through said other opening to said cylinder after said seal valve is closed urges said unset cement out of said one opening into said second passageway; and hydraulic pressure means in said support means selectively operable to move said valve piston.

13. A tester assembly for use in a cased well bore including a tester section, a cementer section and a sample-receiving section coupled to one another in the recited order, said assembly being adapted to be lowered in a cased well bore, sample-admitting means on said tester section operative to engage and isolate a section of a wall of a casing; explosive means in said tester section for producing a penetration into the earth formations adjacent to the isolated section of the casing; said sample-receiving section including means for receiving a fluid sample from such penetrated earth formations; concentric tubular members extending through said cementer section forming an annular passageway therebetween, the inner tubular member comprising part of a passageway between said tester section and sample-receiving section for passage of fluid therebetween, said cementer section including a tubular housing closed at its ends and forming a cylinder, an annular piston slidably and sealingly received between said outer tubular member and the inner wall of said cylinder, said piston being normally positioned at one end of said cylinder, said cylinder containing unset cement; a first passageway opening to the other end of said cement filled portion of said cylinder and coupling said cylinder to said sample-admitting means for plugging such penetrated earth formations after a fluid sample is obtained and while the wall of the casing is isolated; a second passageway coupling said annular passageway between said one end of said cylinder and the exterior of said support member to admit fluid under pressure to said annular piston; and normally closed valve means for said first and second passageways; hydraulic pressure means for actuating said normally closed valve means.

14. A tester assembly for use in a cased well bore including a tester section, a cementer section and a sample-receiving section coupled to one another in the recited order, said assembly being adapted to be lowered in a cased well bore, sample-admitting means on said tester section operative to engage and isolate a section of a wall of a casing; explosive means in said tester section for producing a penetration into the earth formations adjacent to the isolated section of the casing; said sample-receiving section including means for receiving a fluid sample from such penetrated earth formations; concentric tubular members extending through said cementer section forming an annular passageway therebetween, the inner tubular member comprising part of a passageway between said tester section and sample-receiving section for passage of fluid therebetween, said cementer section including a tubular housing closed at its ends and forming a cylinder; an annular piston slidably and sealingly received between said outer tubular member and the inner wall of said cylinder, said piston being normally positioned at one end of said cylinder, said cylinder containing unset cement; a first passageway opening to the other end of said cement filled portion of said cylinder and coupling said cylinder to said sample-admitting means for plugging such penetrated earth formations after a fluid sample is obtained and while the wall of the casing is isolated; a second passageway coupling said annular passageway between said one end of said cylinder and the exterior of said support member to admit fluid under pressure to said annular piston; and normally closed valve means for said first and second passageways, said valve means each including a valve cylinder and valve piston with a portion of said valve piston normally blocking a passageway; and hydraulic pressure means for actuating said normally closed valve means.

References Cited in the file of this patent

UNITED STATES PATENTS

| | | |
|---|---|---|
| 2,381,929 | Schlumberger | Aug. 14, 1945 |
| 2,674,313 | Chambers | Apr. 6, 1954 |